US005799302A

United States Patent [19]

Johnson et al.

[11] Patent Number: 5,799,302

[45] Date of Patent: Aug. 25, 1998

[54] METHOD AND SYSTEM FOR MINIMIZING ATTRIBUTE NAMING ERRORS IN SET ORIENTED DUPLICATE DETECTION

[75] Inventors: Robert J. Johnson, Naugatuck; Shawn W. Szturma, Bridgeport, both of Conn.

[73] Assignee: Pitney Bowes Inc., Stamford, Conn.

[21] Appl. No.: 413,579

[22] Filed: Mar. 30, 1995

[51] Int. Cl.[6] .......... G06F 17/30

[52] U.S. Cl. .......... 707/7; 707/7

[58] Field of Search .......... 395/600; 364/401 R, 364/408, 478, 478.07; 707/1, 7; 705/10, 45

[56] References Cited

U.S. PATENT DOCUMENTS

| | | | |
|---|---|---|---|
| 4,853,882 | 8/1989 | Marshall | 364/570 |
| 4,858,907 | 8/1989 | Eisner et al. | 271/124 |
| 5,079,714 | 1/1992 | Manduley et al. | 364/478.07 |
| 5,111,395 | 5/1992 | Smith et al. | 705/45 |
| 5,227,970 | 7/1993 | Harris | 707/1 |
| 5,245,533 | 9/1993 | Marshall | 705/10 |
| 5,276,628 | 1/1994 | Schneiderhan | 364/478.11 |
| 5,303,149 | 4/1994 | Janigian | 364/408 |
| 5,326,181 | 7/1994 | Eisner et al. | 400/104 |
| 5,377,120 | 12/1994 | Humes et al. | 364/478 |
| 5,428,777 | 6/1995 | Perliski et al. | 707/600 |
| 5,680,611 | 10/1997 | Rail et al. | 370/259 |

*Primary Examiner*—Paul R. Lintz

*Attorney, Agent, or Firm*—Robert H. Whisker; Melvin J. Scolnick

[57] ABSTRACT

The invention is a method for detecting duplicate records on a list or in a file and comprises a number of steps. The steps include entering a list, comprised of one or more records, to a data processing system; then, applying a nickname lookup table to the records to determine a common first name. Once a common name has been determined, the method matches a first record from the list with a second record from the list by comparing the fields of the first record with the fields of at least one other record; the comparison is based on a set of pre-determined criteria. The matching sequence determines a duplicate set, wherein the duplicate set is comprised of at least two records with fields that match. The method then lists matching records sequentially so that the system can create a new record by filling each empty field with a next available corresponding field from a subsequent record within the duplicate set. The newly created record is then retained on the original list; and the duplicate records are placed on a second list. Pre-sorting of the list can occur just prior to the matching sequence as well as just prior to outputting the final list. Additionally, the system operator can be given a number of options to provide flexibility. These options can include: manually correcting a record on the duplicate records list; deleting an address record from the list of duplicates; or, outputting the record.

16 Claims, 12 Drawing Sheets

| TYPE OF MATCH | DEFINITION |
|---|---|
| EXACT .......... | THE FIELD PAIR MATCHES EXACTLY. THE MATCH IS CASE INSENSITIVE ALL SPACES REMOVED. |
| VERY CLOSE ..... | PROXIMITY SCORES APPLIED TO ADJACENT FIELD PAIRS EXCEED 90% |
| CLOSE .......... | THE SOUNDEX FUNCTION APPLIED TO THE FIELD PAIR MATCHES EXACTLY |
| DON'T USE .......... | THE FIELD PAIR IS NOT USED WHEN DETERMINING DUPLICATES |

FIG. 4

| METHOD | FIELDS REQUIRED |
|---|---|
| MATCHING EXACT FULL NAMES | FULL NAME |
| MATCHING EXACT ADDRESSES | FULL NAME, STREET, FIRST NAME, ZIP |
| MATCHING SIMILAR ADDRESSES | LAST NAME, STREET, FIRST NAME, ZIP |
| MATCHING EXACT LAST NAMES | LAST NAME |
| MATCHING EXACT COMPANY NAMES | COMPANY |
| MATCHING SIMILAR COMPANY NAMES | COMPANY |
| MATCHING SIMILAR FULL NAMES | FULL NAME |
| MATCHING SIMILAR LAST NAMES | LAST NAME |
| MATCHING HOUSEHOLDS | STREET, ZIP, CITY |
| MATCHING ZIP, ZIP+4, AND DELIVERY POINT | ZIP, ZIP+4, DELIVERY POINT BAR CODE |
| CUSTOM METHOD | |

| TYPE OF MATCH | DEFINITION |
|---|---|
| EXACT ................. | THE FIELD PAIR MATCHES EXACTLY. THE MATCH IS CASE INSENSITIVE ALL SPACES REMOVED. |
| VERY CLOSE ...... | PROXIMITY SCORES APPLIED TO ADJACENT FIELD PAIRS EXCEED 90% |
| CLOSE ................. | THE SOUNDEX FUNCTION APPLIED TO THE FIELD PAIR MATCHES EXACTLY |
| DON'T USE .......... | THE FIELD PAIR IS NOT USED WHEN DETERMINING DUPLICATES |

METHOD AND SYSTEM FOR MINIMIZING ATTRIBUTE NAMING ERRORS IN SET ORIENTED DUPLICATE DETECTION

RELATED APPLICATION

Reference is made to U.S. patent application Ser. No. 08/413,653 with a Notice of Allowance issued therefor on Mar. 21, 1997, entitled APPARATUS AND METHOD FOR GENERATING 100% UNITED STATES POSTAL SERVICE BAR CODED LISTS, assigned to the assignee of this application and filed on even date herewith.

BACKGROUND OF THE INVENTION

The United States Postal Service (U.S.P.S.), as well as the postal services of other countries, provide discounts from basic rates for various classes of mail. Thus, postal service customers mailing in bulk, pre-sorting mail runs, or who are willing to wait longer periods of time for delivery can benefit from these discounted rates. Additionally, the postal service will grant discounts to customers who are willing to make the flow of mail easier for the postal service.

The rapid growth in computer driven technology in the recent past, has produced better methods and better apparatus for the handling of mail. Thus, the use of zip codes to move the mail has evolved so as to create efficiencies from the expansion of the zip code field and the use of corresponding bar codes. The Post Net bar code is an example of a United States Postal Service (U.S.P.S.) initiative to provide efficient routing of mail pieces through the use of scanning and routing mechanisms that can read a bar code on a mail piece and quickly route that mail piece to its intended destination. In order to encourage its customers to employ the use of correct addressing, Zip+4, and Post Net bar coding, the U.S.P.S. offers discounts that generally pay their customers back for the cost of upgrade in a relatively short period of time. The greater the volumes of mail, the greater the marginal utility to be achieved.

Systems have been used or proposed to meet the need to produce mail pieces imprinted with bar codes, and to enable mailers to obtain the benefit of the discounts offered for such mail. One such system is described in U.S. Pat. No. 4,858,907, for a SYSTEM FOR FEEDING ENVELOPES FOR SIMULTANEOUS PRINTING OF ADDRESSES AND BAR CODES, issued to Eisner et al. on Aug. 22, 1989. This patent discloses a system for printing envelopes with addresses, zip codes, and corresponding bar codes. The system is controlled by a computer which includes software for converting a zip code included in the address into bar code form and then adding the bar code representation to the material to be printed on the envelope.

Another example of the art is found in U.S. Pat. No. 5,326,181 for an ENVELOPE ADDRESSING SYSTEM ADAPTED TO SIMULTANEOUSLY PRINT ADDRESSES AND BAR CODES; issued on Jul. 5, 1994 to Eisner et al. This patent teaches a method of addressing substrates with a human readable address containing a zip code and a bar code corresponding to the zip code.

Both of the Eisner et al. patents (U.S. Pat. Nos. 4,858,907 and 5,326,181) address the specific need of mailers to reduce costs by utilizing bar codes when printing to a mail piece. But, the reduction of costs can be associated with other components of the mail stream as well. For instance, U.S. Pat. No. 5,377,120 for an APPARATUS FOR COMMINGLING AND ADDRESSING MAILPIECES, issued Dec. 27, 1994, to Humes et al., is concerned primarily with preparing a plurality of pre-printed, unaddressed, non-alike mail pieces from pre-determined sources into grouped bundles organized in a manner to receive low postal rates. Indeed, Humes et al. goes on to state that: "Due to automation, lower postal rates are available for mail pieces which are addressed with machine readable addressing such as bar codes or the like. . . . a minimum number of pieces must be in each grouping to qualify for the lower postal rates."

And, while Humes et al. offers an apparatus to commingle address lists and produce grouped bundles for delivery at the lowest postal rates, and the Eisner et al. patents detail the benefits of bar code use, there is still a short-coming that exists in the prior art with respect to the use of address lists. The very address lists that are being input into the systems of Eisner et al. and Humes et al. may cause cost inefficiencies due to the presence of duplicate or inconsistent address records contained within those lists.

Address lists or files are comprised of address records. In large address lists or address files, there may be a number of address records which contain redundant or partially duplicated fields. The use of postal coding, bulk shipment discounts, or pre-sorted mail discounts is only as efficient as the address list to which the coding or discounts are applied. Thus, a mass mailing that utilizes an address list with redundant or partially duplicated addresses lacks efficiency, because the mailer will have to either separate redundant mail pieces, or bear the expense of unnecessary postage, handling, and material costs for sending a mail piece to the same location twice while trying to qualify for lower postal rates.

The elimination of defective entries from a particular list is the basic premise behind systems that seek to eliminate duplicate entries from those mailing lists. An example of the art is found in U.S. Pat. No. 5,303,149 for a SYSTEM FOR ELIMINATING DUPLICATE ENTRIES FROM A MAILING LIST; issued on Apr. 12, 1994 to Janigian. Janigian is concerned with the reduction of solicitations where the addressee might be receiving duplicate mailings.

The system of Janigian requires that address records be converted to a standard format and then the records are sorted so that similar records will then be compared to each other. The individual records are split into data elements and then the system takes a first record and compares it to another record by examining the elements one at a time. It should be noted that Janigian's data element splitting method is fixed and is thus not externally updateable. Further, Janigian's system is limited to comparing address field data and does not act upon other fields within the address record.

Therefore, it is an object of the present invention to provide a method and apparatus for generating an address list that will allow shippers to get the greatest possible benefit from such a list by reducing the costs of redundant mailings, both in terms of monetary expense and customer goodwill.

SUMMARY OF THE INVENTION

According to the invention, the object is achieved and the disadvantages of the prior art are overcome by a method and system for minimizing attribute naming errors in set oriented duplicate detection.

The method comprises a number of steps. These steps include entering a list to a data processing system, more particularly an address list to an addressing system, wherein the list is comprised of one or more records and the records are further comprised of one or more fields. The fields comprise data identifying a list entry by a plurality of characteristics, such as: name fields; location fields; or code fields. The method then applies a nickname lookup table to the records. The nickname lookup table comprises a series of one or more nicknames corresponding to a common first name. The nickname that is located within one of the record fields is then matched against the nickname lookup table to determine a proper name that might be applicable.

Once a proper name has been determined, the method matches a first record from the list with a second record from the list by comparing the fields of the first record with the fields of at least one other record; the comparison is based on a set of pre-selected criteria. The matching sequence determines a duplicate set, wherein the duplicate set is comprised of at least two records with fields that match as determined by the set of pre-selected criteria.

The method then takes the set of matching records and lists them sequentially so that the system can create a new record by filling each empty field with a next available corresponding field from a subsequent record within the duplicate set. The newly created record is then retained on the original list; and the duplicate records are placed on a second list.

The method is preferably embodied within an addressing system; the addressing system comprising: a data processing device with a memory operatively connected thereto; an addressing printer with a media source such as a bin feeder or a cassette; a page printer with a media source; a display; and a keyboard. It should be noted, however, that the method can be successfully employed for any list format and is not limited to addressing records.

The system can employ pre-sorting techniques on the list at at least two stages of the method. Pre-sorting can occur just prior to the matching sequence as well as just prior to outputting the final list (original list less duplicate entries) to the language interpreter of a printer. Further steps in the method include: outputting the final list to the language interpreter of a printer; if the record is an address record, then determining a corresponding bar code; retaining the list of duplicates in a memory; and generating a report in respect of the first list.

Within the method, the system operator can be given a number of options to provide flexibility. These options can include: manually correcting a record on the duplicate records list so as to: (i) include a corresponding bar code; (ii) transfer a corrected record to first list; and, (iii) retain the records that are not corrected; deleting an address record from the list of duplicates; or outputting the record.

BRIEF DESCRIPTION OF THE DRAWINGS

FIG. 4 is an example of the information displayed on the screen used by the system operator for establishing the match criteria method and the fields required for implementation.

DETAILED DESCRIPTION OF THE PREFERRED EMBODIMENTS

Figure 1A:
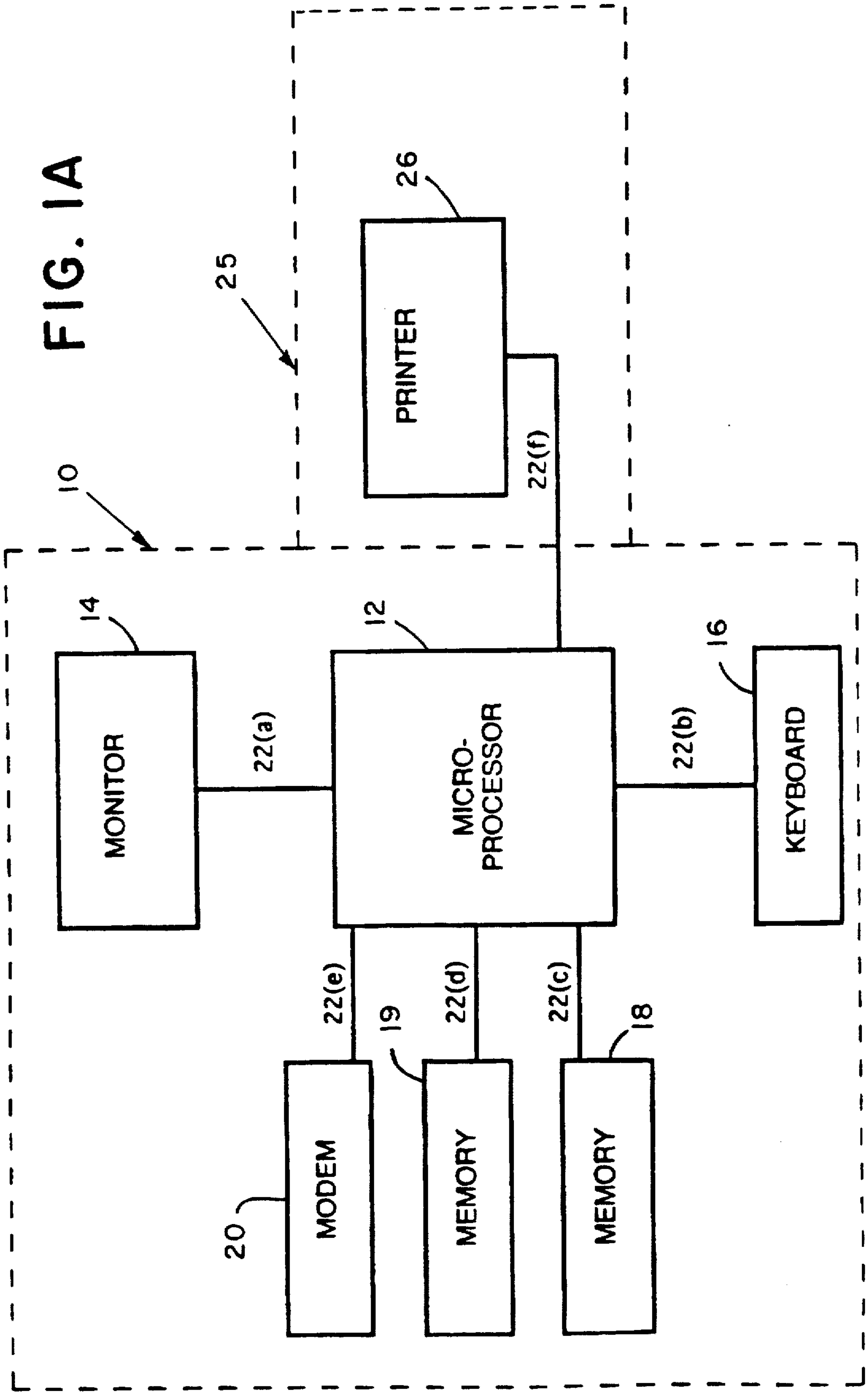
FIG. 1A is a block diagram of an system that could employ the invention method to eliminate duplicates from a list.

Turning to FIG. 1, there are depicted in block form two subsets that, combined, form an addressing system.

Addressing subsystem 10 includes: microprocessor 12 connected to monitor 14 by interface cable 22*a*; keyboard 16 connected to microprocessor 12 by interface cable 22*b*; memory 18 operatively connected to microprocessor 12 at 22*c*; memory 19 operatively connected to microprocessor 12 at 22*d*; modem 20 connected to microprocessor 12 by interface cable 22*e*; and interface cable 22*f* for connection to addressing subsystem 25.

Addressing subsystem 25 includes: printer 26 connected to addressing subsystem 10 by interface cable 22*f*.

Figure 1B:
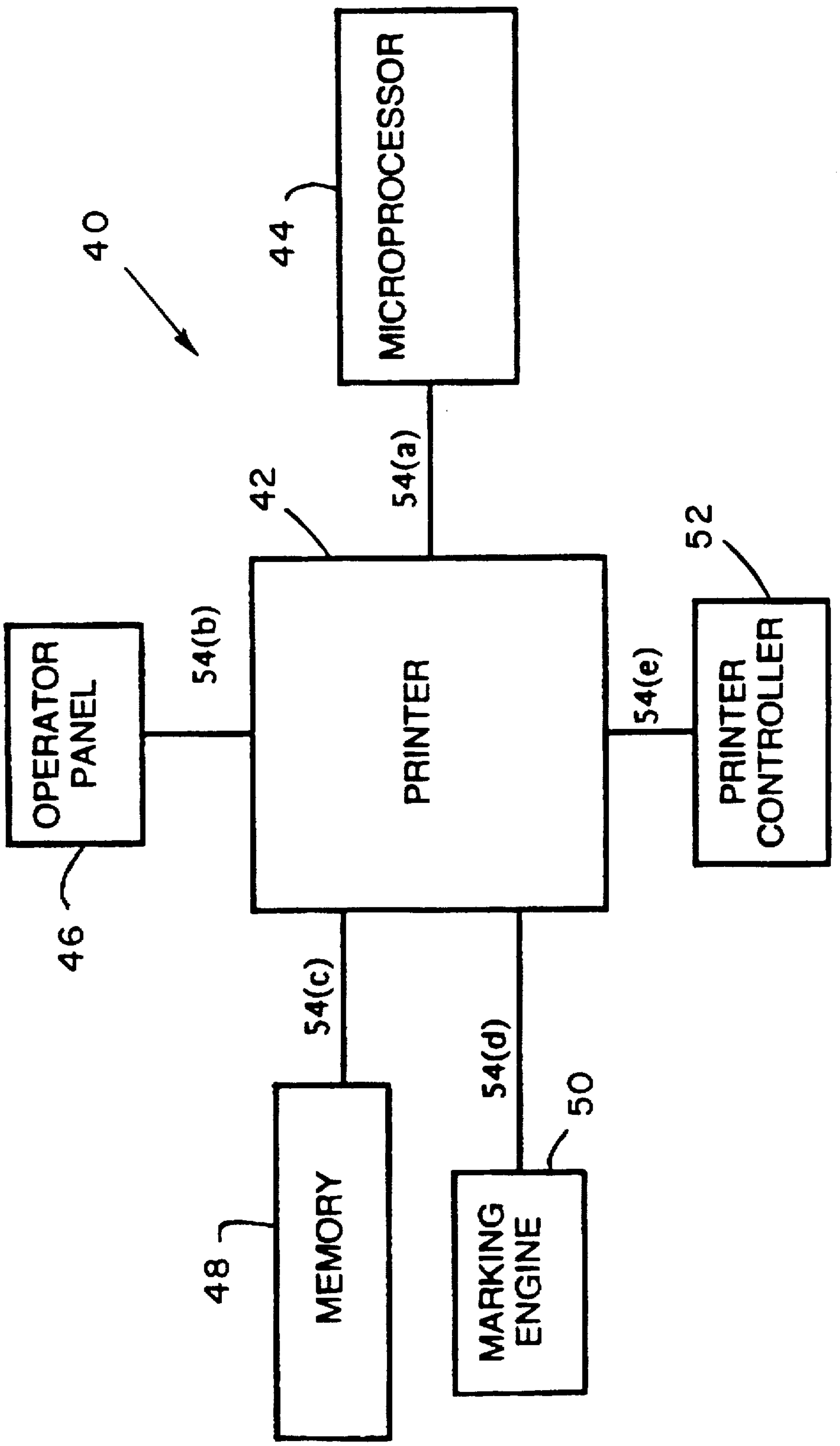
FIG. 1 B is a block diagram of an alternative embodiment of a system that could employ the invention method to eliminate duplicates from a list.

A microcomputer, or any computer that can download data that can be printed on a printer, whether that printer is a peripheral device of the computer or not, uses application programs for creating data. These are resident in the microcomputer ROM memory and in memory 18; memory 19 is utilized for the storing of address lists. The printers commonly utilized in the addressing art may also contain a microprocessor that is able to assign bar code data to addresses that are delivered from the host. These so-called "smart" printers vary in their ability to process data. FIG. 1B is a block diagram of an alternative embodiment of the invention that is based on a smart printer.

Turning to FIG. 1B, system 40 is depicted as comprising: printer 42 which is operatively connected to microprocessor 44 at 54*a*; operator panel 46 operatively connected to printer 42 at 54*b*; memory 48 operatively connected to printer 42 at 54*c*; marking engine 50 operatively connected to printer 42 at 54*d*; and, printer controller 52 operatively connected to printer 42 at 54*e*.

Figure 2:
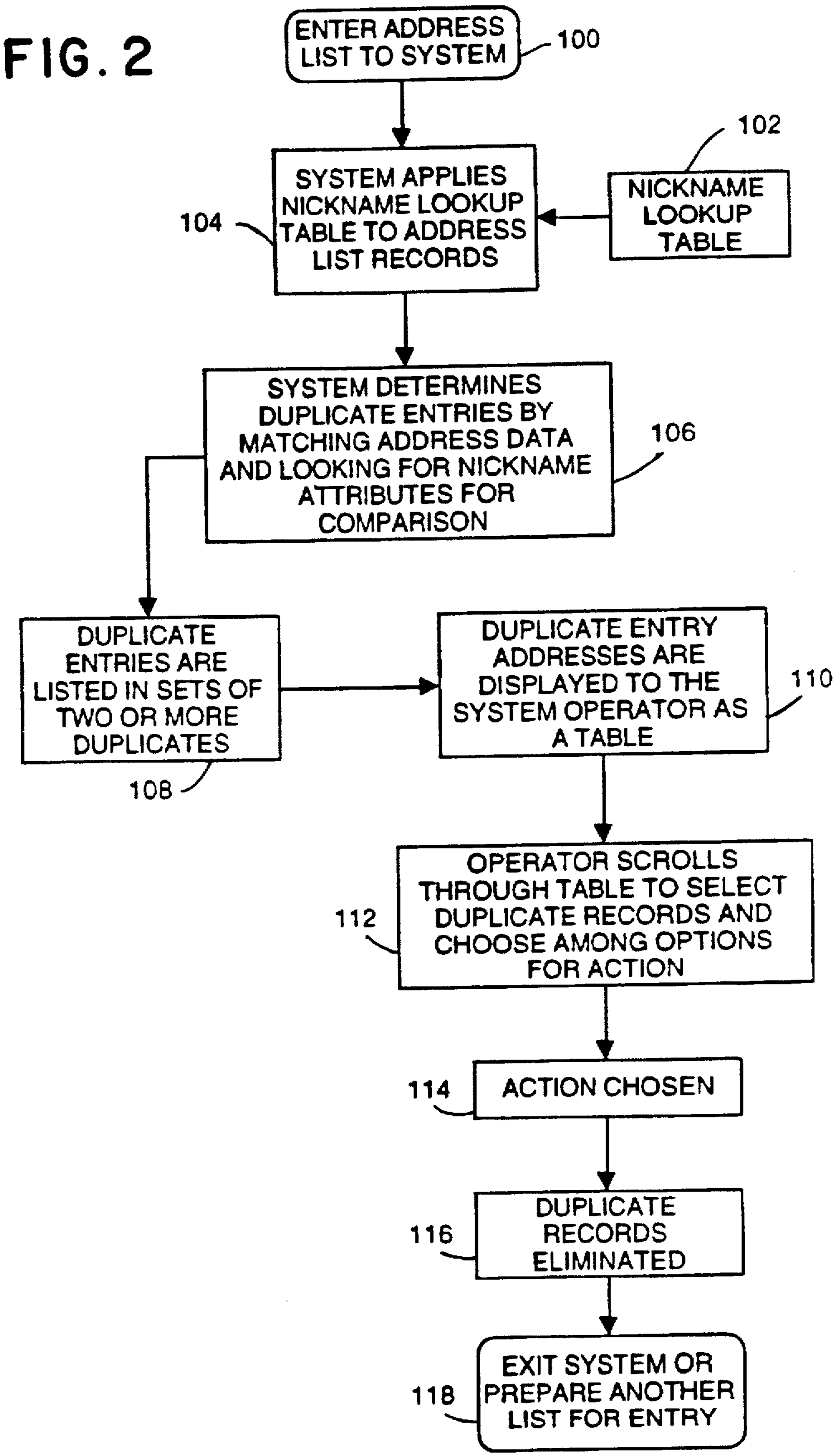
FIG. 2 is a high level flowchart of the invention method.

Turning to FIG. 2, there is shown a high level flowchart of the invention method. The method begins with the entry of an address list to the system at step 100, though the method can and does successfully work from the input of any list type where the matching of records can work from a nickname to a common name. From the list input, the system advances to step 104. In parallel with the advance to step 104, is the entry of nickname lookup table 102 to the system for use at step 104. At step 104, the system applies nickname lookup table 102 to the records of the address list and a pre-sort can be done at this point that makes the optimum use of the list characteristics. Applying a nickname lookup table means searching a nickname table to determine if a name listed in an address field of an address record is a nickname and, if so, substituting a corresponding proper name for the purpose of determining if records match. Therefore, the construction of the nickname lookup table is extremely important.

The method advances to step 106 where the system determines whether or not there are duplicate entries by matching address data and nickname/proper name relationships for comparison. Once duplicate entries have been determined, the method advances to step 108 where the duplicate entries are listed in sets of two or more duplicates. Duplicate entry addresses are displayed to the system operator as a table at step 110. At step 112, the system operator can scroll through the table to view and act upon the duplicate records. The system operator has several options available at this point; duplicate entries can be: marked for elimination; corrected if appropriate; or merged to form a new address record. The system operator makes an action choice at step 114; and then, at step 116, the duplicate records are eliminated from the list to be retained. The method then advances to step 118 where the system operator exits the system or can prepare another list for entry.

Figure 3A:
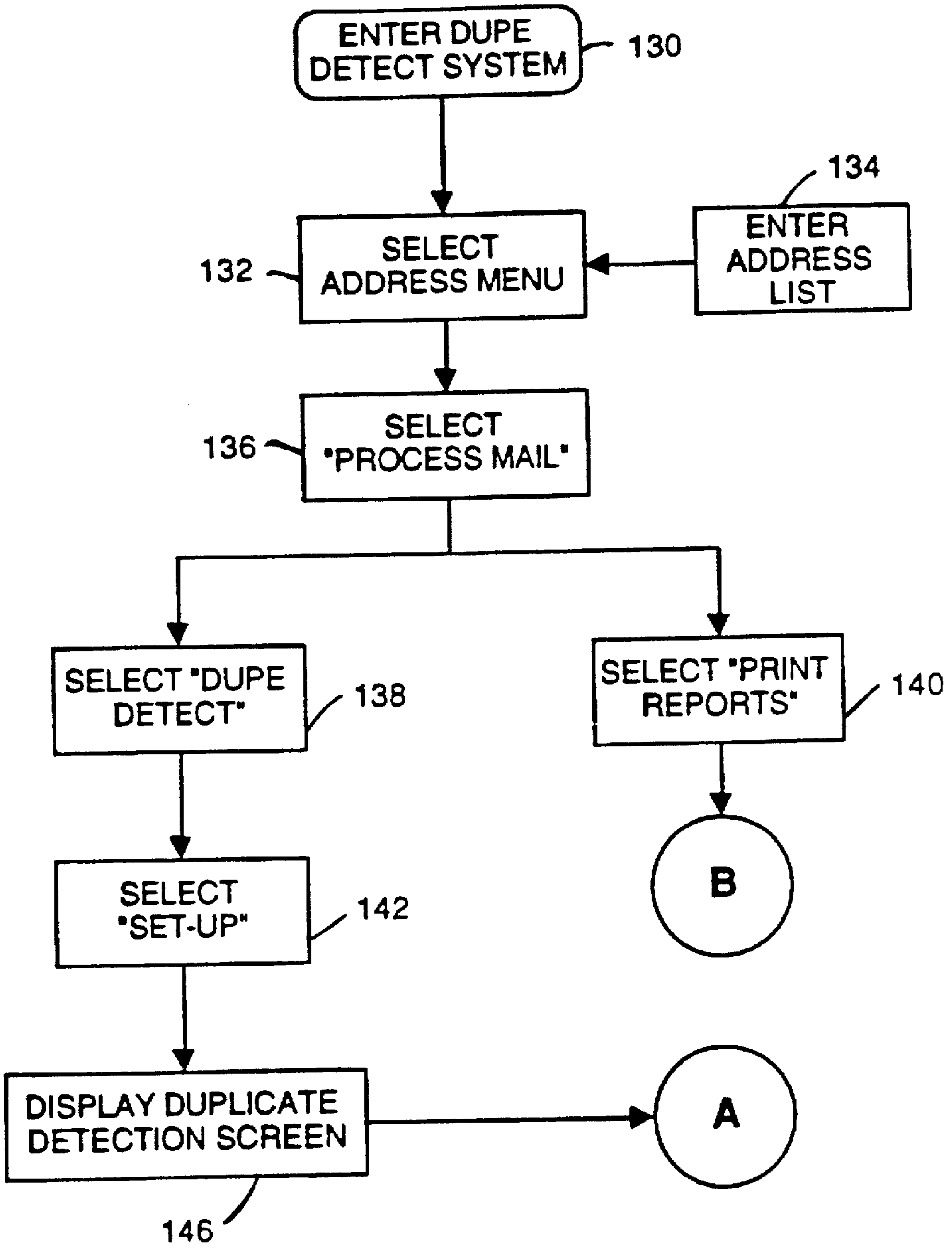
FIGS. 3A–3H are a flowchart of the invention method that begins with the decision to employ duplicate detection on a list or series of records; the flow path continues from FIG. 3A through to FIG. 3H.

Turning to FIG. 3A, the detailed method flow begins at step 130 when the system operator enters the duplicate detection system. The system operator advances to step 132 and selects the addressing menu whereupon an address list can be input 134 to the system to be acted upon by the method. With an address list entered, the system operator selects PROCESS MAIL, at step 136, from the address menu. The system operator is then presented with a sub-menu that allows the system operator to progress to either step 138 or to step 140.

At step 138, the system operator selects DUPE DETECT and then advances directly to step 142 and selects SET-UP. After selecting SET-UP, the method advances to step 146 and displays the Duplicate Detection screen to the system operator. From step 146, the method advances along path A to FIG. 3B.

Figure 3B:
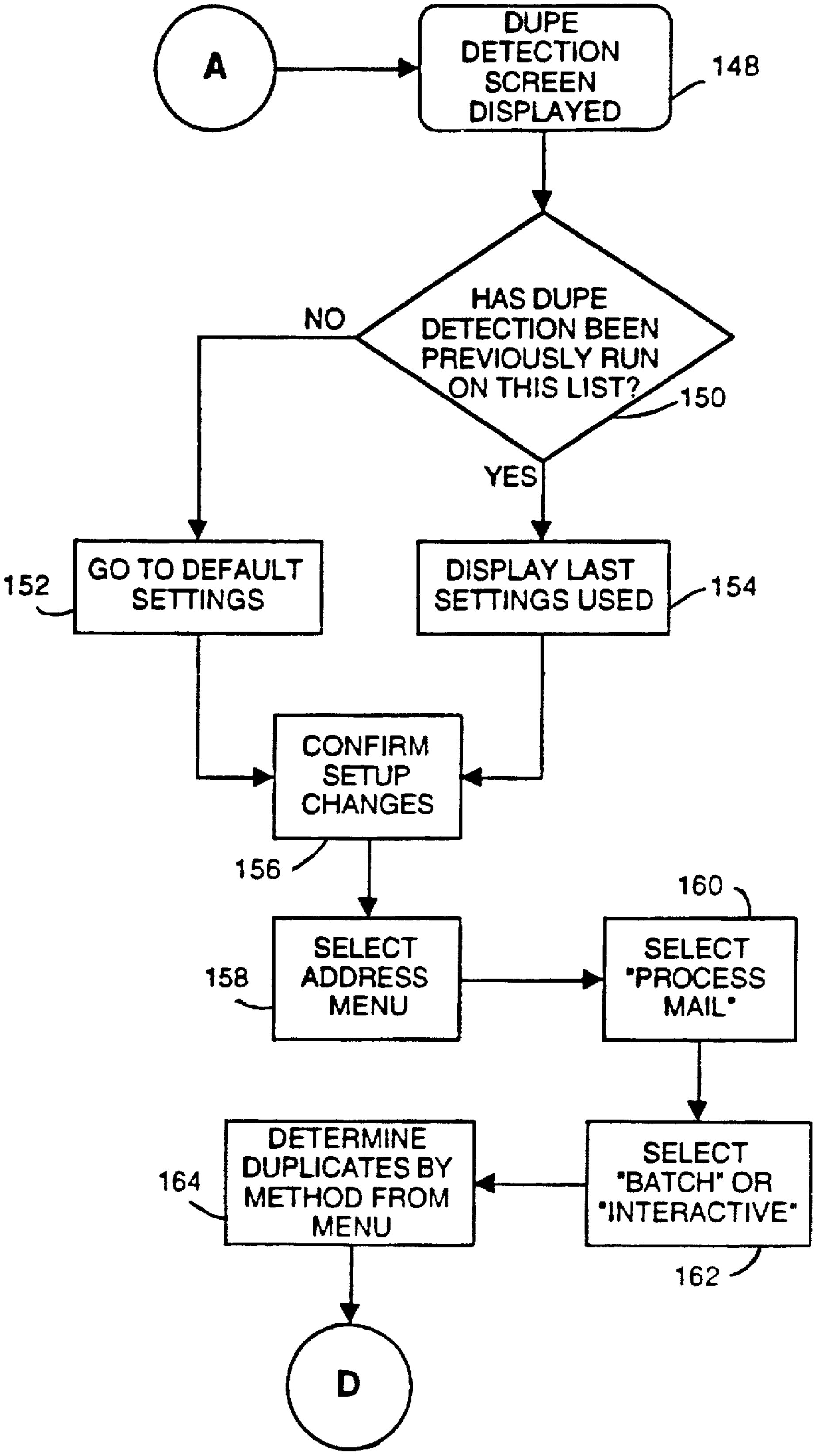

Turning to FIG. 3B, path A enters at step 148 with the display of the duplicate detection screen to the system operator. The method advances to a query at step 150 which asks whether or not a duplicate detection has previously been run on the list. If the response to the query is "NO," then the method advances to step 152 where default settings are prepared for the list. Default settings can be established at system setup by the system operator. From step 152, the method advances to step 156. If, however, the response to the query at step 150 is "YES," then the method advances to step 154 where the most recent settings are prepared for the list. From step 154, the method advances to step 156.

At step 156, the system confirms the setup changes prior to the method advancing to step 158. With the setup changes established, the system operator can select the Address Menu at step 158. The method then advances to step 160 where the system operator selects "Process Mail" from the sub-menu. From step 160, the method advances to step 162 where the system operator selects either "batch" or "interactive" for listing records within a duplicate set. With these parameters set, the method advances to step 164 where the system operator is presented with a menu for selection of a duplicate detection scheme. That menu (see FIG. 4) is further described herein in detail. From step 164, the method advances along path D to FIG. 3E.

It is important to note that the nickname lookup table can be established in a number of different ways depending upon what is convenient to the system user. For instance, where "Bobby" could be part of a name field within the address record, the corresponding proper name would be determined to be "Robert." Among other possible formats, the table could be further detailed to include company or state nickname matches; for example: "New York Knicks" would be read from the table as "New York Knickerbockers;" "Big Blue" and "I.B.M." would be read as "Intentional Business Machines Corporation;" or "N.Y." could be read as "New York State."

Returning back to path D, we turn to FIG. 3E. Path D enters at step 196 where the fields to be matched for a chosen duplicate detection method are selected by the system operator from among the listed or "custom" criteria. An example of the screen displayed to the operator for this important step is displayed in FIG. 4.

Figure 3C:
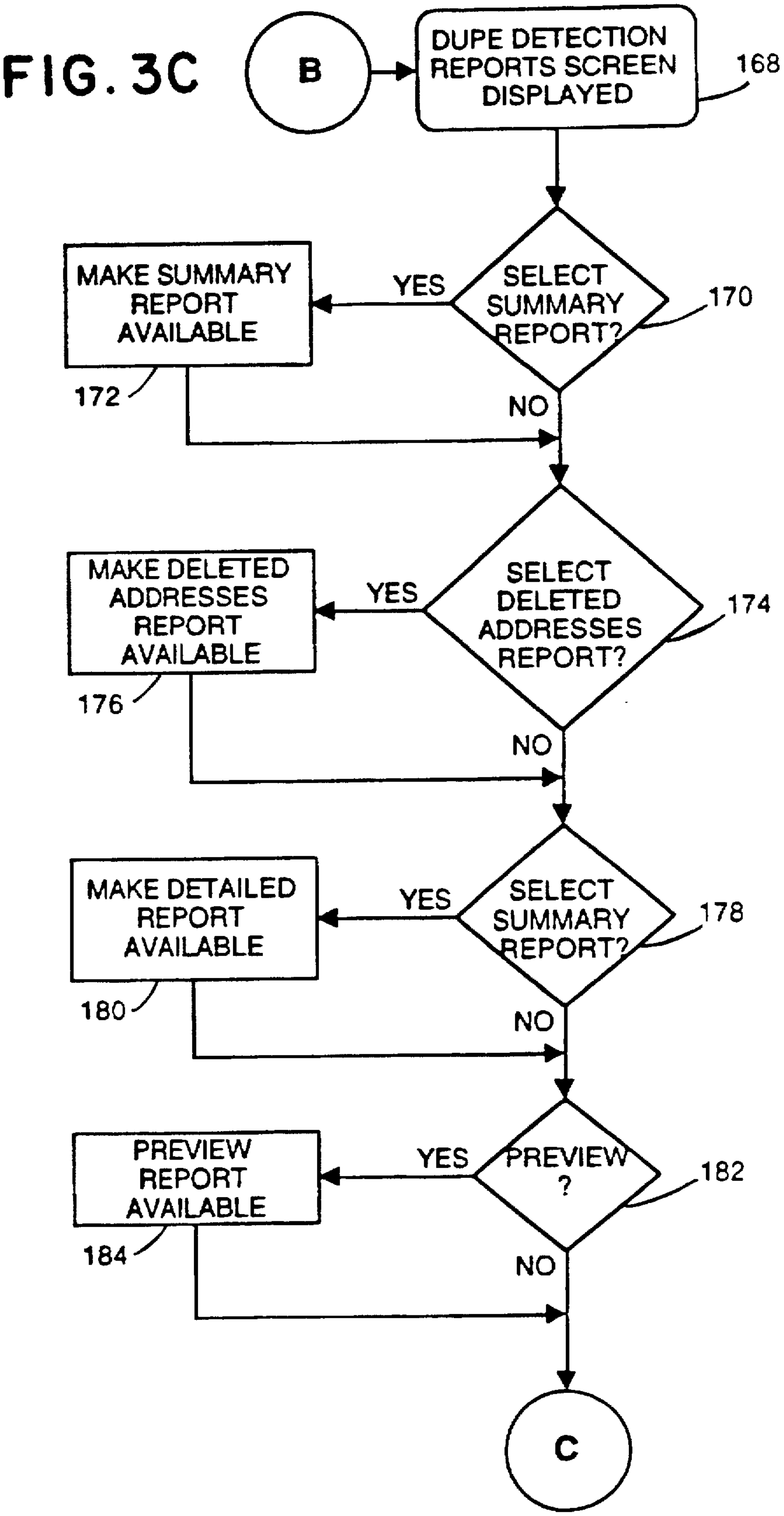
Figure 3D:
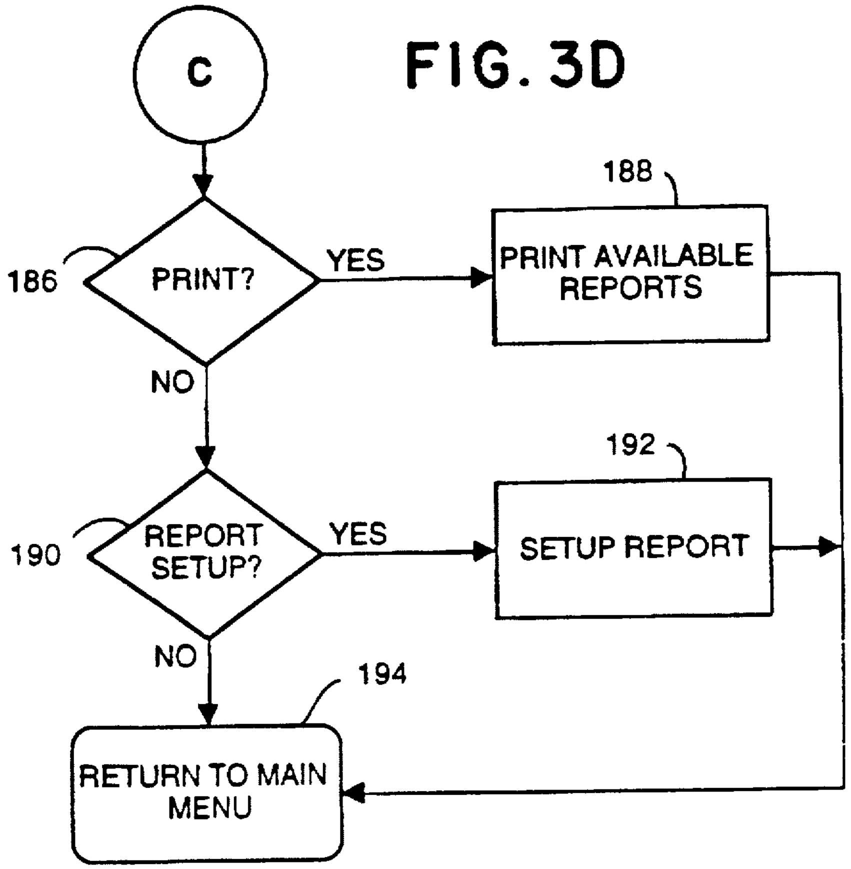
Figure 3E:
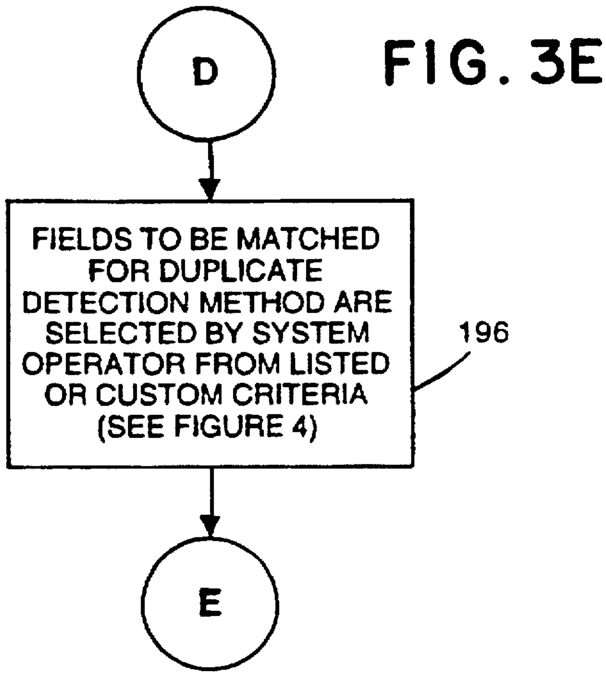
Figure 3F:
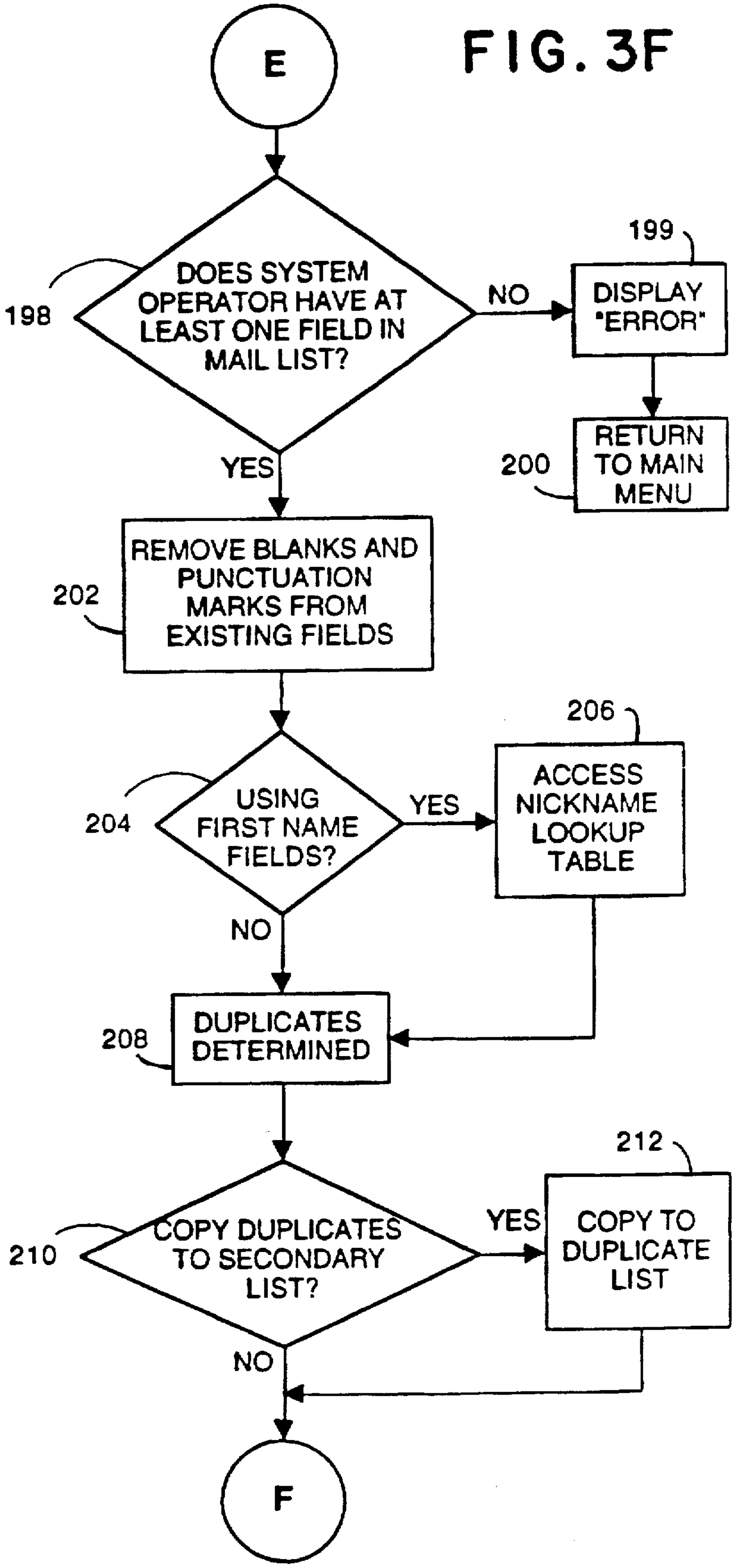

The method advances from step 196, along path E, to FIG. 3F.

Turning to FIG. 3F, with the system operator having chosen a duplicate detection method, Path E enters at step 198 where the method queries the system operator to determine whether or not the system operator has at least one field upon which to act within the entered address list. If the response to the query at step 198 is "YES," then the method advances to step 202. If, however, the response to the query at step 198 was "NO," then the system displays an ERROR at step 199 and returns at step 200 to the Main Menu.

Returning to step 202, the system will remove blanks and punctuation marks from the existing fields within each record so as to uniformly apply matching rules; these rules are discussed later in detail with respect to FIG. 4 and FIG. 5 herein. From step 202, the method advances to a query at step 204.

The query at step 204 asks whether or not first name fields will be used for matching. If the response to the query is "YES," then the system, at step 206, will take a name listed within the name field of the record and select a corresponding proper name from which matches can be determined. If however, the response to the query at step 204 is "NO," then the method advances to step 208 and determines the duplicate records as determined by the selected criteria. After determining the duplicate records at step 208, the method advances to a query at step 210.

The query at step 210 asks whether or not duplicate records should be copied to a secondary list. If the response to the query is "YES," then the method advances to step 212 where the duplicates are copied to a Duplicate Record List. Once the duplicates are copied to the Duplicate Record List, they may later be marked for deletion from the original list; the method then advances to path F. If the response to the query at step 210 is "NO," then the method advances directly from step 210, along path F, to FIG. 3G.

Figure 3G:
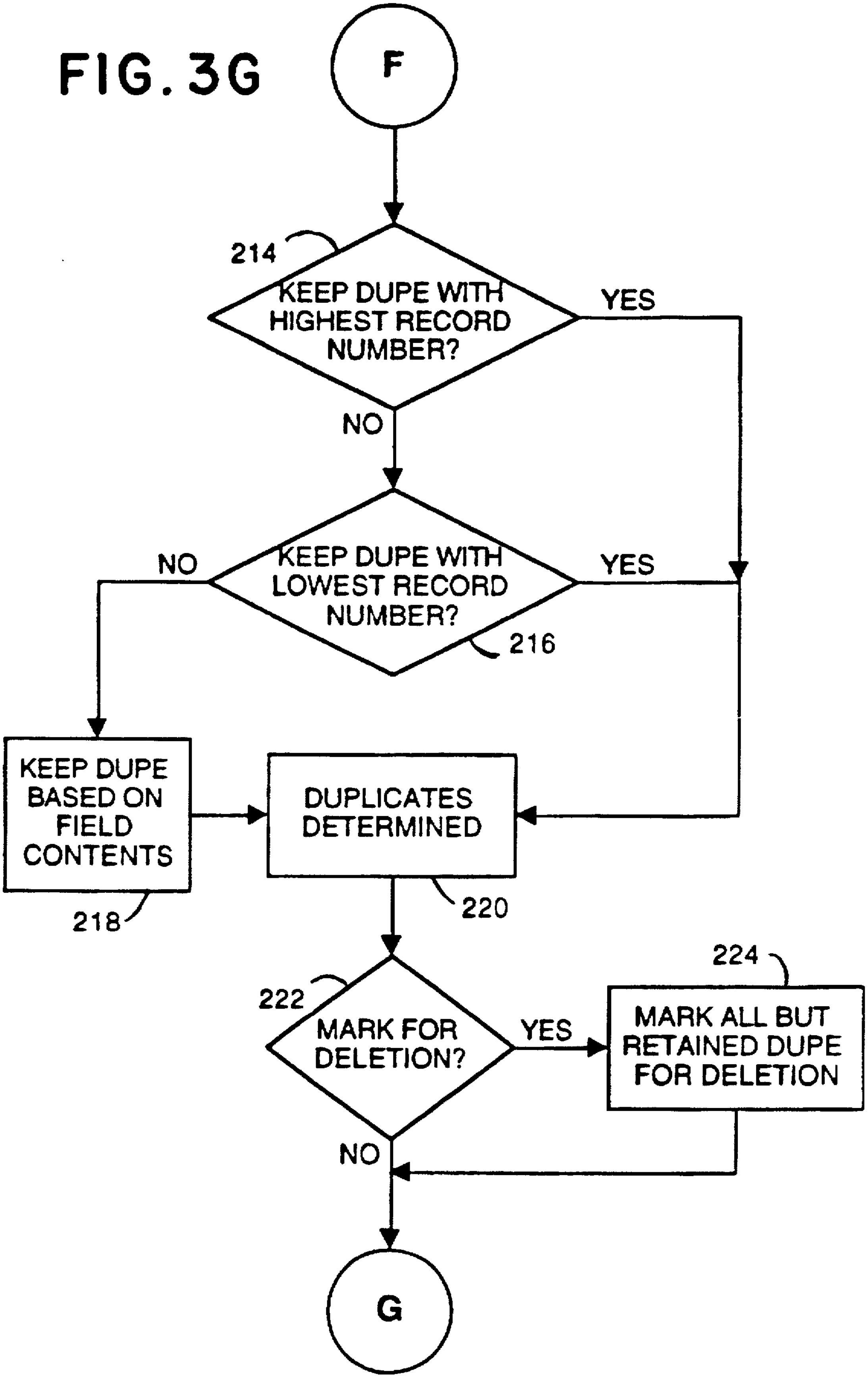

Turning to FIG. 3G, Path F enters at step 214. The query at step 214 asks whether or not the system should keep a selected duplicate with the highest record number. If the response to the query is "YES," then the method advances directly to step 220 where the duplicate records are determined based on record number. If the response to the query at step 214 is "NO," then the method advances to a query at step 216. At step 216, the method queries as to whether or not the system should keep a selected duplicate with the lowest record number. If the response to the query is "YES," then the method advances to step 220 where the duplicate records are determined based on record number. If the response to the query at step 216 is "NO," then the method advances to step 218 where a determination is made to keep the duplicate entry as based upon the field contents alone. This latter determination may be required in cases where two people with the same name are located at the same address, or where one person needs to be contacted at more than one location.

From step 220, the method advances to step 222. At step 222, the method asks whether or not any records have been marked for deletion. If the response to the query is "YES," then the method advances to step 224 where the duplicates are marked for deletion. Once the duplicates are marked for deletion, the method then advances to path G. If the response to the query at step 222 is "NO," then the method advances directly from step 222, along path G, to FIG. 3H.

Figure 3H:
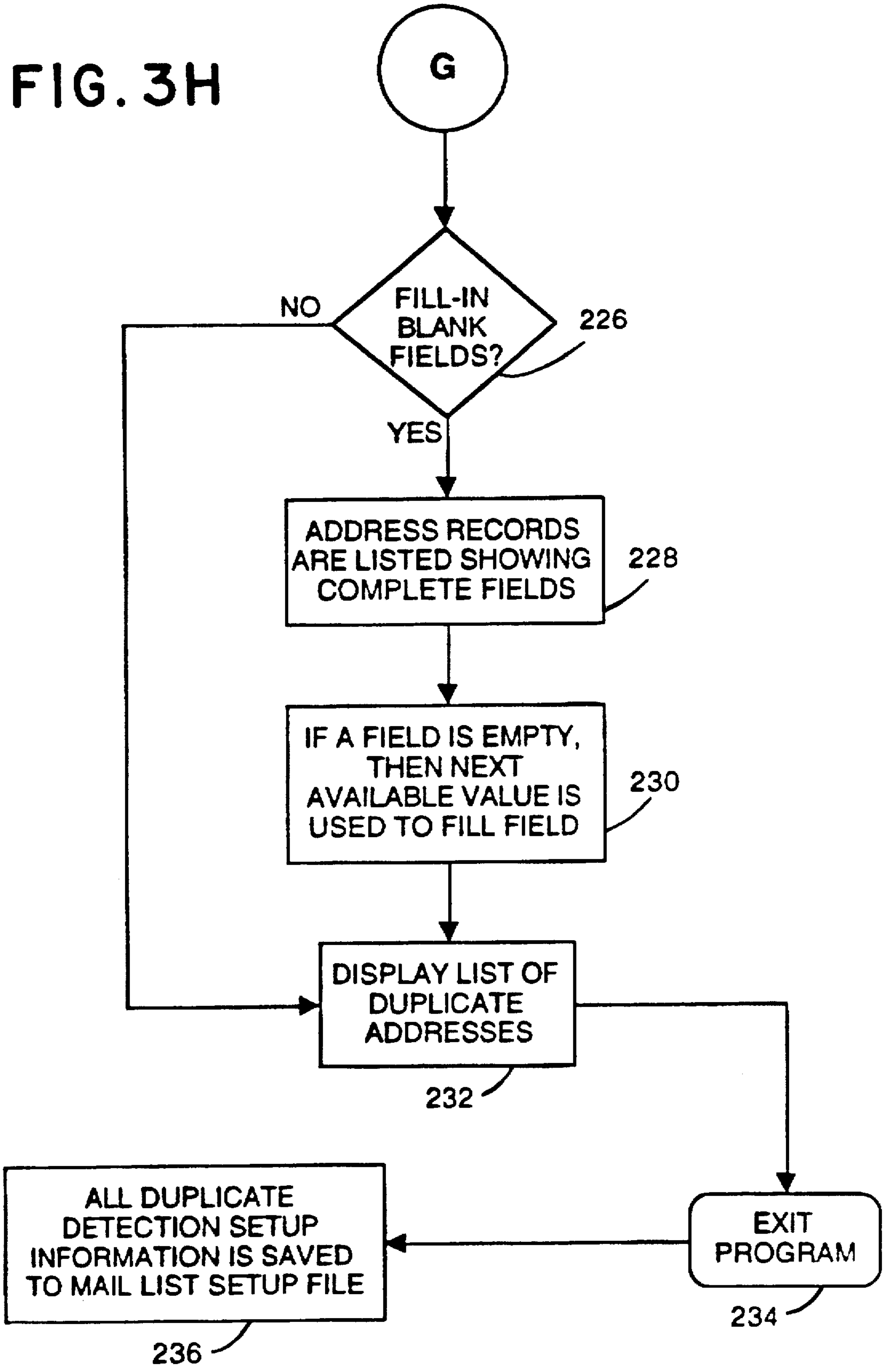

Turning to FIG. 3H, Path G enters at step 226. Step 226 is a query which asks if a selected duplicate record is to have any blank fields filled in with data to be selected from other duplicate records within its duplicate set. If the response to the query is "NO," then the system advances directly to step 232 and displays the Duplicate Record List. Once the Duplicate Record List is displayed, the system deletes the duplicate records from the original list and the method advances to step 234 where the system operator exits the Duplicate Detection program. If, however, the response to the query at step 226 is "YES," then the system displays, at step 228, the duplicate address records of each set in a sequence order (sequence can be alphabetical, numerical, chronological, etc.). The method advances to step 230 where the system brings forward into any blank fields of the first record of the set, from the next subsequent record, any data found in a field that corresponds to the blank field of the first record. The newly "created" first record is retained and the system displays the list of duplicate addresses at step 232. At step 234, the system operator exits the Duplicate Detection program while the system saves all duplicate detection information to the Mail List Setup file at step 236.

Once, all applicable address records are created and/or retained to the address list, the list can be outputted for bar coding or other processes.

Returning to step 136, if the system operator advanced to step 140 by selecting PRINT REPORTS, then the method advances along path B to FIG. 3C.

On path B, we turn to FIG. 3C. Path B enters at step 168 with the display of the duplicate detection screen to the system operator. The method advances to a query, at step 170, which asks if the Summary Report is to be selected. If the response to the query is "YES," then the system makes the Summary Report available, at step 172, for viewing or printing and advances to a query step 174. If, however, the response to the query at step 170 is "NO," then the method advances directly to the query of step 174.

At step 174, the method asks if the Deleted Addresses Report is to be selected. If the response to the query is "YES," then the system makes the Deleted Addresses Report available, at step 176, for viewing or printing and advances to a query step 178. If, however, the response to the query at step 174 is "NO," then the method advances directly to the query of step 178.

At step 178, the method asks if the Detailed Report is to be selected. If the response to the query is "YES," then the system makes the Detailed Report available, at step 180, for viewing or printing and advances to a query step 182. If, however, the response to the query at step 178 is "NO," then the method advances directly to the query of step 182.

At step 182, the method asks if the system operator wants to preview any report which is to be selected. If the response to the query is "YES," then the system produces the report preview at step 184 and advances to a path C. If, however, the response to the query at step 182 is "NO," then the method advances directly to path C. The method advances along path C to FIG. 3D.

Turning to FIG. 3D, path C enters, at step 186, to a query. The query at step 186 asks whether or not the system operator desires to print a copy of the available reports. If the response to the query is "YES," then the system prints the copy(ies) at step 188 and then advances directly to step 194. If, however, the response to the query at step 186 is "NO," then the method advances to the query at step 190. The query at step 190 asks whether or not the system operator desires to print a copy of the Setup Report. If the response to the query is "YES," then the system produces the report at step 192 and then advances directly to step 194. If, however, the response to the query at step 190 is "NO," then the method advances to step 194. At step 194, the method returns to the Reports menu selection at step 140.

FIG. 4 is an example of the screen displayed to the system operator, whereby the various Duplicate Detection methods can be selected. The fields required for each method are listed to the right of the chosen method. Only one method can be selected at a time; however, if the CUSTOM METHOD is selected, then it is possible to select more than one of the previously listed methods in combination as the Custom choice.

Figure 5:
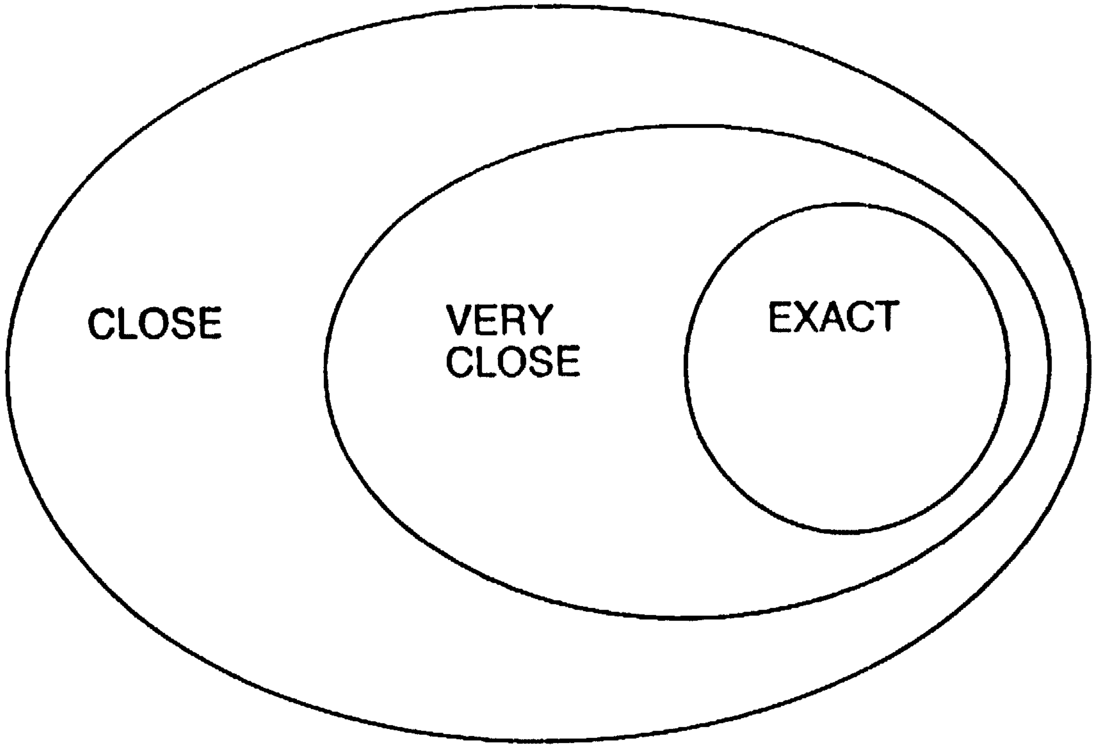
FIG. 5 is a relationship diagram depicting the degree of certainty which can be selected for match criteria.

FIG. 5 is a relationship diagram that illustrates the degree of precision to which record matches can be subjected. If the system operator has selected the CUSTOM METHOD of Duplicate Detection, the system operator is given a choice of determining match precision as follows:

| Type of Match | Definition |
|---|---|
| Exact | The field pair matches exactly |
| Very Close | Proximity scores are applied. |
| Close | The Soundex function applied. |

The diagram indicates, for example, that addresses that are considered "exact" matches, must also be considered "close" matches. Likewise, "very close" matches must also be considered "close" matches. In other words, "very close" is a superset of "exact" and "close" is a superset of both "very close" and "exact." The ability to apply exact, Soundex, or proximity scoring are each known separately. Soundex and proximity scoring are further described in more detail hereinbelow. What is important to note, however, is that the prior art does not mix the "exact," "very close," or "close" relationships in such a way as to combine the scoring techniques to minimize attribute naming errors in set oriented duplicate detection. The degree of duplicate control is in the hands of the system operator.

An example of commercially available proximity scoring rules which can be applied to the "Very Close" match type is hardware string matching available from Proximity Technologies of Fort Lauderdale, Fla. (33308) on their PF474 (chip) firmware. Hardware string matching on the PF474 chip is accomplished by assigning a proximity value to a pair of strings; the higher the assigned value, the closer the match.

The Soundex system is a commercially available system, developed for use in census taking, which categorizes and groups names which may sound similar and which may be variations of each other. A Soundex code consists of the first letter of the of the surname, followed by three (3) numbers assigned according to the following coding scheme:

| | | | |
|---|---|---|---|
| A = Skip | H = Skip | O = Skip | V = 1 |
| B = 1 | I = Skip | P = 1 | W = Skip |
| C = 2 | J = 2 | Q = 2 | X = 2 |
| D = 3 | k = 2 | R = 6 | Y = Skip |
| E = 4 | L = 4 | S = 2 | Z = 2 |
| F = 5 | M = 5 | T = 3 | |
| G = 6 | N = 5 | U = Skip | |

Each letter of a name is taken in order; zeroes are added if there are not enough letters to derive three numbers. If two letters in sequence have the same code, then those two letters are coded as if they were one letter. Two examples follow:

Washington=W252

Lee=L000

While there are some special cases further provided for in the Soundex rules, a complete discussion of these is not necessary here for a complete understanding of the invention claimed herein.

As can be appreciated by those skilled in the art, a number of variations of the subject invention are possible. These variations include, but are not limited to: the ability of the printer employed within the system; the steps for handling the non-coded address record list which can be altered depending upon the target recipient group for the mailing being conducted; the volume of the mailing can further effect discounts and contribute to the decision on how to deal with the uncoded list; the nature of the non-address data to be printed to the substrate; the substrate itself could be an envelope, a card, or a folded mailpiece; and, the ability to make corrections to an address list.

One of the more important variations possible, is the ability of the system to be flexible enough to handle the input of lists of a varied nature. Customer records, personnel files, transaction records, student records, etc., can all be acted upon by the invention disclosed herein.

What is claimed is:

1. A method of detecting duplicate entries in an address file, comprising the steps of:

(a) entering an address list to an addressing system, wherein said address list is comprised of one or more address records and said address records are comprised of one or more address fields;

(b) applying a nickname lookup table to said address records, wherein said nickname lookup table comprises one or more nicknames corresponding to a common first name, said one or more nicknames located in one of said address fields; and further comprising the step of selecting the degree of precision to which a match sequence can be subjected;

(c) performing said match sequence by matching a first record from said address list with a second record and subsequent records, if any, from said address list by comparing said one or more address fields of said first record with said one or more address fields of said second or subsequent records;

(d) repeating said match sequence for each of said subsequent records;

(e) determining a duplicate set, wherein said duplicate set is comprised of all address records with address fields that match as determined by a set of pre-selected criteria;

(f) listing said duplicate set so that each address record follows sequentially;

(g) determining an address record to be retained within said address list; and (h) retaining said address record within said address list; and placing said duplicate set on a second list.

2. The method of claim 1, wherein a new address record is formed by filling each empty address field within said address record with a next available corresponding field from said subsequent address record within said listing of said duplicate set.

3. The method of claim 2, wherein if said next available corresponding field would produce an incorrect address, then deleting said next available corresponding field and continuing in sequence to a second next available corresponding field from a second subsequent address record; said sequence to continue until said empty address field is filled or until there are no more corresponding fields available.

4. The method of claim 1, wherein said addressing system comprises:

(a) a data processing device with a memory operatively connected thereto;

(b) an addressing printer with a media source;

(c) a page printer with a media source;

(d) a display; and (e) a keyboard.

5. The method of claim 4, wherein said media source is a bin feeder or a cassette.

6. The method of claim 1, further comprising the step of presorting said address list prior to outputting said address list to a language interpreter of a printer.

7. The method of claim 1, further comprising the steps of:

(a) outputting said address list to a language interpreter of a printer;

(b) retaining said second list in a memory of said data processing device; and (c) generating a report in respect of said first list.

8. The method of claim 1, further comprising the step of determining a corresponding bar code in respect of said retained new address record.

9. The method of claim 1, wherein said nickname lookup table comprises a first field comprised of nicknames and a second field comprised of common names in respect of said nicknames.

10. The method of claim 1, wherein said pre-selected set of criteria comprises a choice to be made from among one or more choices derived from said address fields.

11. The method of claim 1, wherein said address fields comprise data identifying an addressee by a plurality of characteristics, said characteristics comprising:

(a) name fields;

(b) location fields; and (c) code fields.

12. The method of claim 4, wherein said data processing device is resident within said addressing printer.

13. The method of claim 4, wherein said data processing device is resident in a host computer exclusive of said addressing printer.

14. The method of claim 1, wherein said duplicate set is displayed to a system operator as a table of duplicate records and said system operator can scroll through said table to view said duplicate records.

15. The method of claim 1, or of claim 14, wherein a system operator is given an option to:

(a) manually correct an address record on said second list to: (i) include a corresponding bar code; (ii) transfer said corrected address record to said address list; and, (iii) retain said address records that are not corrected;

(b) delete said address record from said second list; or (c) output said address record.

16. An addressing system for detecting duplicate entries in an address file, comprising:

a. means for entering an address list, wherein said address list is comprised of one or more address records and said address records are comprised of one or more address fields;

b. means for applying a nickname lookup table to said address records, wherein said nickname lookup table comprises one or more nicknames corresponding to a common first name, said one or more nicknames located in one of said address fields; said applying means further comprising means for selecting the degree of precision to which a match sequence can be subjected;

c. means for performing said match sequence for each of said address records by matching a first record from said address list with a second record and subsequent records, if any, from said address list by comparing said one or more address fields of said first record with said one or more address fields of said second or subsequent records, and repeating said match sequence for each of said subsequent records;

d. means for determining a duplicate set, wherein said duplicate set is comprised of all address records with address fields that match as determined by a set of pre-selected criteria;

e. means for listing said duplicate set so that each address record follows sequentially;

f. means for determining an address record to be retained within said address list; and g. means for retaining said address record within said address list; and placing said duplicate set on a second list.

* * * * *